Dec. 31, 1968     R. G. McMILLEN     3,419,103
STEERING MECHANISM
Filed Jan. 23, 1967     Sheet 1 of 3
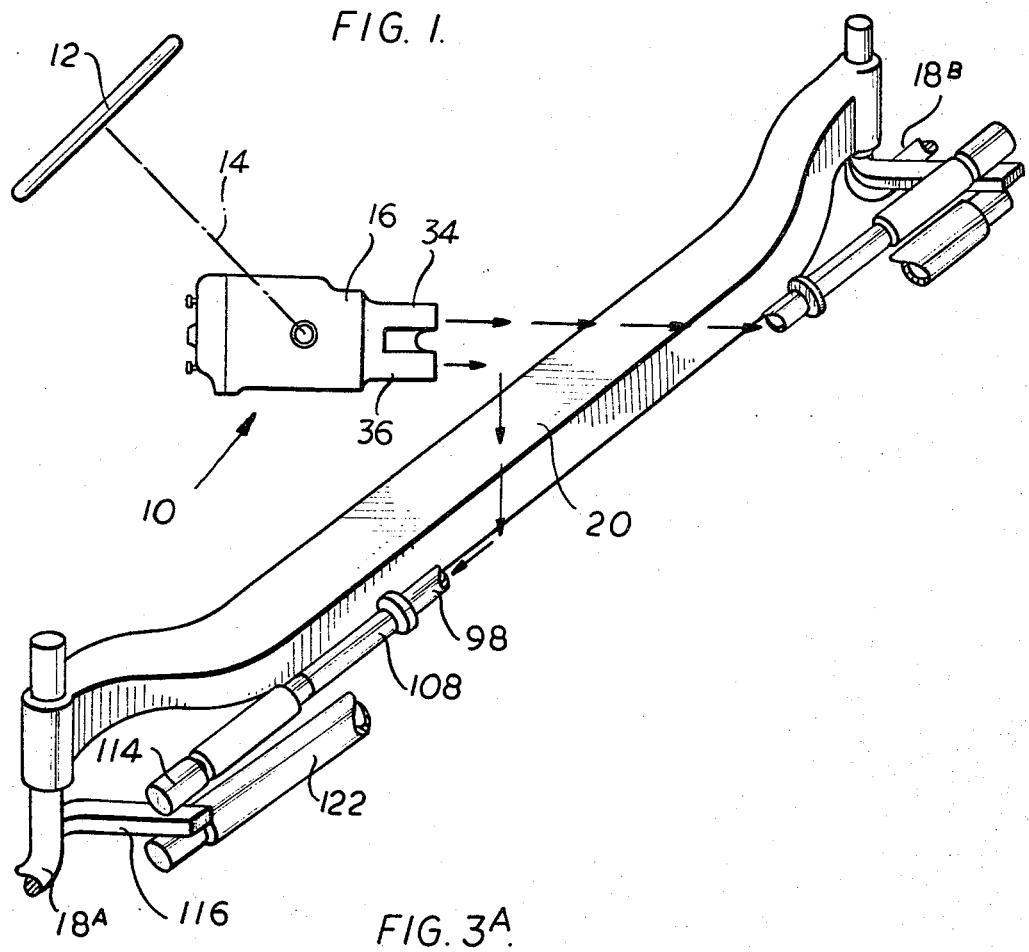
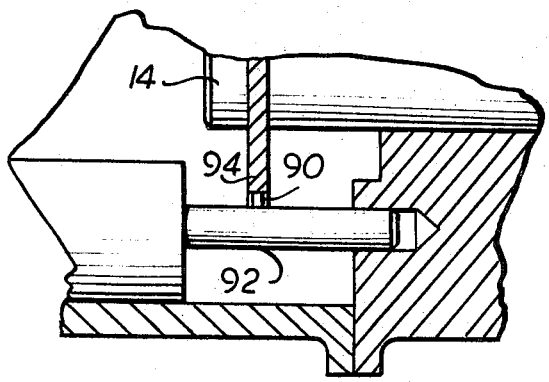
INVENTOR
RUSSELL G. McMILLEN
*Frederick J. Hauke*
ATTY

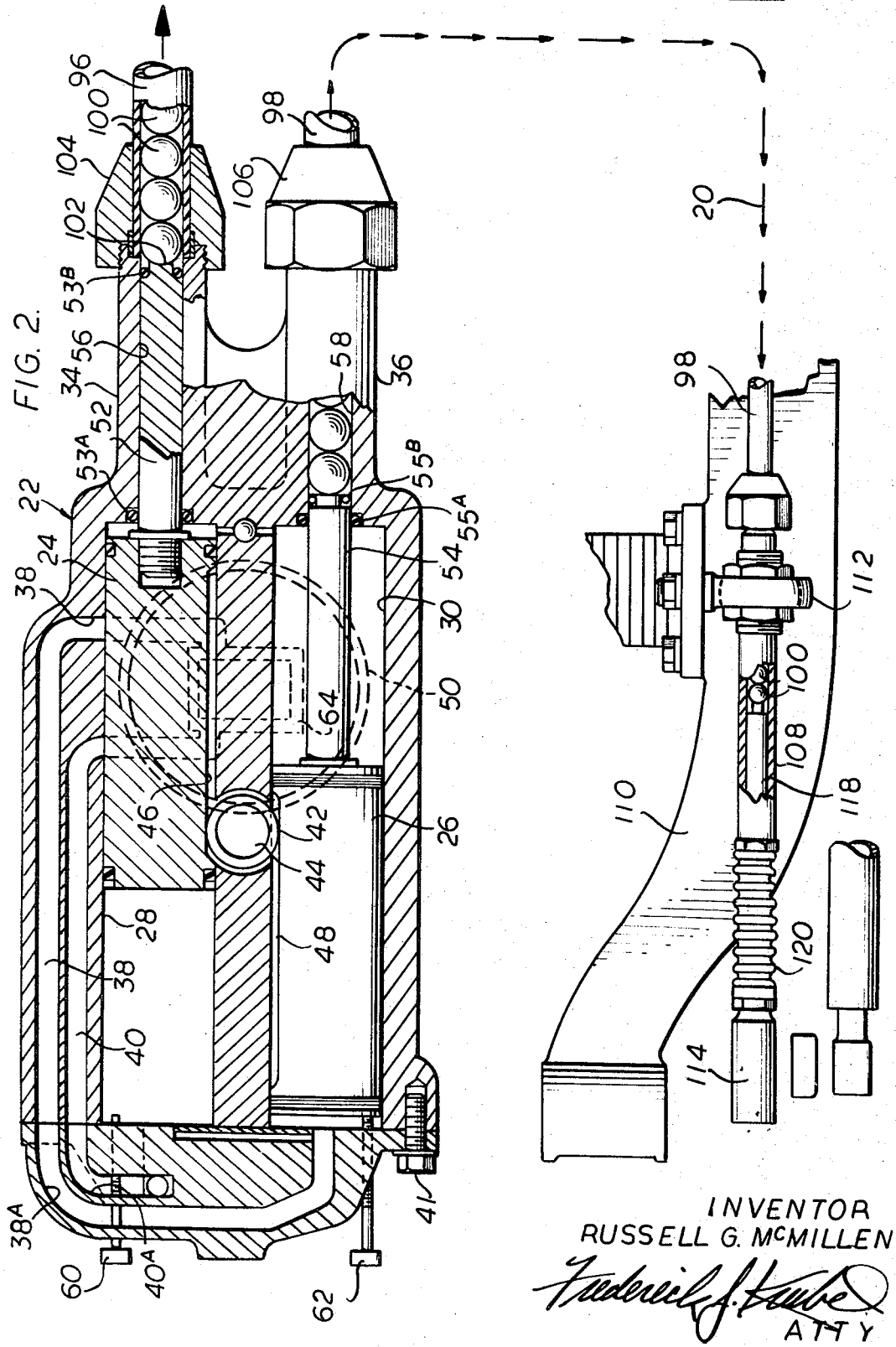

INVENTOR
RUSSELL G. McMILLEN

United States Patent Office 3,419,103
Patented Dec. 31, 1968

3,419,103
STEERING MECHANISM
Russell G. McMillen, Fort Wayne, Ind., assignor to International Harvester Company, Chicago, Ill., a corporation of Delaware
Filed Jan. 23, 1967, Ser. No. 610,893
5 Claims. (Cl. 180—79.2)

ABSTRACT OF THE DISCLOSURE

A steering mechanism for a vehicle having a steering control unit positioned remotely from the vehicle axle. The steering control unit which is both hydraulically and mechanically actuated is operatively connected to the wheels of the vehicle by a flexible motion transmitting means which includes flexible tubing and rollers therein for transmitting motion between the control unit and the vehicle wheels.

---

This invention relates to a vehicle steering mechanism and more particularly to a mechanism wherein portions thereof may be located remotely from and operated independently of the vehicle axle to which the vehicle wheels are operatively connected.

A principal object of this invention is to provide a vehicle steering mechanism utilizing a flexible motion transmitting means and including a steering control unit which can be located remotely from and indepedent of the geometry and articulation of the axle.

Another object is to provide a steering control unit which is simultaneously hydraulically and mechanically actuated by movement of the vehicle steering wheel and which includes piston means, the movement of which is transmitted through flexible motion transmitting means to the vehicle wheels.

The above and other objects and advantages will be more readily apparent when read in conjunction with the accompanying drawings in which:

FIGURE 1 is a diagrammatic view of the steering mechanism of a motor vehicle;

FIGURE 2 is a sectional view in elevation of a steering control unit and a portion of the motion transmitting means shown connected between the steering control unit and a vehicle frame member;

FIGURE 3a is a plan view of a portion of the valve of FIGURE 3 showing the drive connection between the steering column and the linearly movable spool valve of the control valve;

Figure 3:
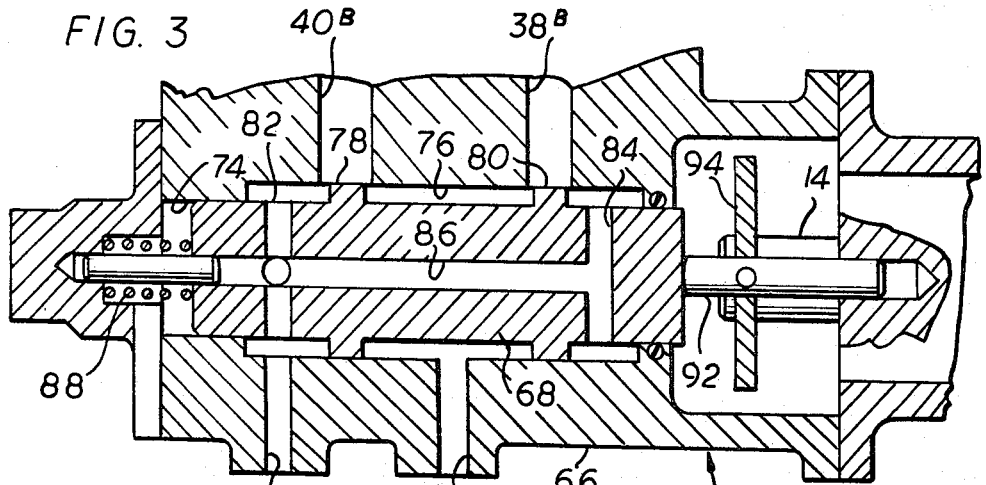
FIGURE 3 is a sectional view of the steering control unit hydraulic control valve in its neutral position.

Referring now to the drawings, wherein like reference characters in the several views refer to the same parts, 10 designates generally the steering mechanism of a vehicle. It includes a steering wheel 12 mounted on a steering column 14, a steering control unit 16, steering knuckle means 18 mounted on the chassis frame, and flexible motion transmitting means 20 connected between the steering control unit and the steering knuckle means.

The steering control unit 16 comprises a housing 22 and piston means disposed in the housing preferably comprising a pair of piston members 24 and 26 disposed respectively in bores 28 and 30 formed in the housing 22. Means are provided to move the piston members 24 and 26 back and forth in opposite directions. Such means include mechanical means and hydraulic means which act in conjunction to assist each other. The piston members 24 and 26 are actuated by rotation of the steering wheel and are operatively connected to the flexible motion transmitting means 20 so that movement of the piston members is transmitted to the steering knuckle means 18 and the wheels attached thereto. The steering control unit 16 may be mounted at an appropriate place on the vehicle chassis with which it is associated to make a connection with the steering column 14. The flexible motion transmitting means 20 allows the steering control unit 16 to be mounted remotely from the independently of the vehicle axle.

The housing 22 may be in the form of an elongated casting closed at one end by the end cap member 32 and having bosses 34 and 36 formed at the other end for reasons to be hereinafter further described. The housing could be constructed so that the boss members 34 and 36 are formed on a separate end cap member which could be attached to a casting which is open at its right end as viewed in FIGURE 2. As already noted, cylindrical bores 28 and 30 are formed in the housing 32 to accommodate the pistons 24 and 26. A pair of fluid passages 38 and 40 may also be formed in the housing 22 which communicate respectively with piston cylinders 30 and 28 through fluid passage extensions 38a and 40a formed in end cap member 32. The end cap member 32 may be secured in place by any suitable means, such for example, as a plurality of machine bolts 41.

As clearly seen in FIGURE 2, piston members 24 and 26 are disposed in a parallel relationship. One means for moving the piston members from right to left and vice versa is through a gearing arrangement which is actuated by the steering wheel 12. A pinion gear 42, which may be in the form of a spur gear, is secured to a shaft 44 which is rotatably supported in the housing 22 by suitable means (not shown). The gear 42 is in mesh with gear racks 46 and 48 integral with the piston members 24 and 26 respectively. The gear racks 46 and 48 are disposed on the outer periphery of the piston members parallel to the piston axes and may be formed thereon or may be made separably and affixed thereto. Since the pistons 24 and 26 are disposed on opposite sides of the gear 42 rotation of the latter will move the pistons 24 and 26 relative to each other. The shaft 44 and gear 42 attached thereto are rotated by a connection to the steering column 14. This connection may be through gear 50 on the steering column and a second gear on shaft 44 (not shown) which meshes with gear 50, a selected ratio existing between the latter two gears for manual effort.

A pusher rod 52 is connected to the right end of piston 24, and a pusher rod 54 is connected to the right end of piston 26 by suitable means such as by screwing them into the ends of the pistons. These pusher rods 52 and 54 extend respectively into bores 56 and 58 formed in bosses 34 and 36 to actuate the motion transmitting means 20 as hereinafter more fully explained. Bearing means 53a and 53b at opposite ends of pusher rod 52 and bearing means 55a and 55b at opposite ends of pusher rod 54 may be provided to assure easy movement of the pusher rods in their respective bores in the bosses 34 and 36.

Adjustable stops 60 and 62 extend through the end cap member 32 and are associated respectively with pistons 24 and 26 to determine the limits of movements of the pistons to the left.

Hydraulic means are provided to assist in moving the pistons 24 and 26. A hydraulic control valve mechanism 64, which may either be separate from or connected to the housing 22, is provided to selectively direct fluid under pressure from a fluid pump (not shown) to the piston 24 or 26 via conduits or fluid passages 40 and 38 respectively. The valve mechanism 64 may be a shuttle type, for example, comprising a valve body 66 and a reciprocable spool valve 68 to which axial movement is imparted by rotation of the steering wheel 12 through a suitable connection therewith. The valve mechanism has formed therein an inlet passage 70 to receive fluid under pressure from a pump (not shown) and outlet passages 38b and 40b which communicate with passages 38 and 40 in the housing 22. A return passage 72 is also formed in the valve body 66 through which pressure fluid is dumped back into a fluid reservoir from which the pump will draw a suction to recirculate fluid to the steering control unit as needed. A bore 74 in the body 66 slidably supports the valve 68. A central portion of the bore 74 defines an enlarged bore 76.

The spool valve 68 has a pair of lands 78 and 80 formed on the circumference thereof. A plurality of radial passages 82 are formed at one end and a plurality of passages 84 are formed at the other end of valve 68, and these passages communicate with an axial extending passage 86 and the valve 68. The lands 78 and 80 are axially spaced and so positioned that they bracket the inlet passage 70. In its neutral position as shown in FIGURE 3 the lands 78 and 80 are positioned with respect to the passages 38b and 40b so flow of pressure fluid may move across the lands through passages 82, 84 and 86 and back to the reservoir through return passage 72. Means are provided to normally maintain the valve 68 in a neutral position. This may be done by the use of appropriate spring means such as spring 88.

Means are provided to shift the valve to the right or left depending on the direction the vehicle wheels are to be turned. The valve 68 is positioned by the steering wheel 12 to which it is operatively connected through a follower 90 on a valve spool extension 92 which is adapted to mesh with a gear 94 attached to or actuated by the steering column 14.

Figure 4:
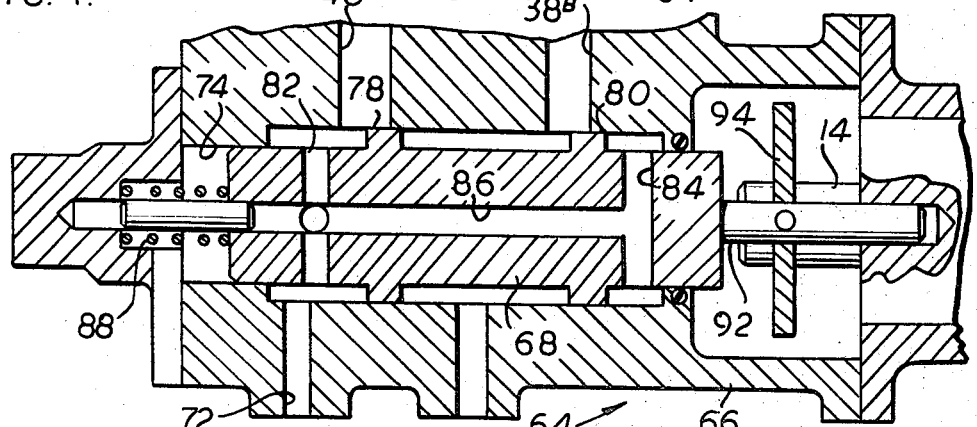
FIGURE 4 is a sectional view of the valve of FIGURE 3 showing the valve in an actuated positon to permit the vehicle wheels to be turned to the right.
Figure 5:
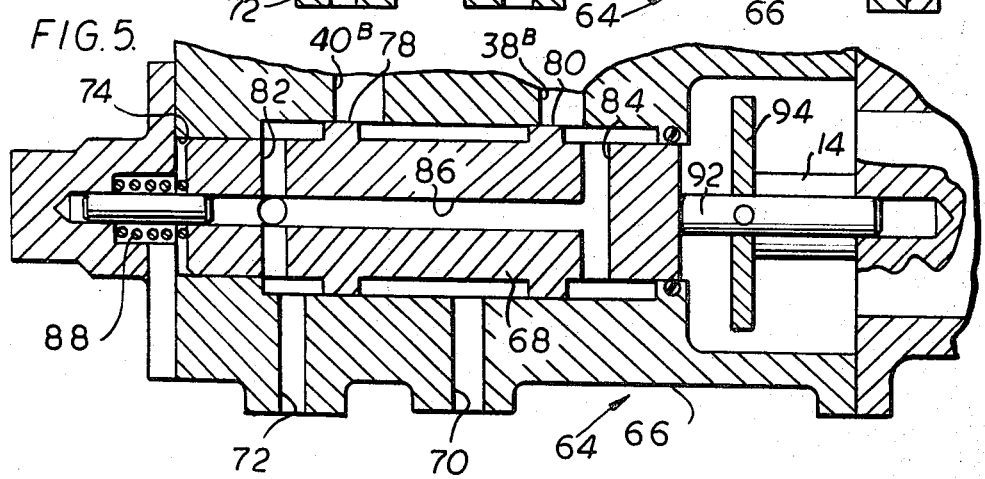
FIGURE 5 is a sectional view of the valve of FIGURE 3 showing the valve in an actuated position to permit the vehicle wheels to be turned to the left.

FIGURE 4 shows the valve spool 68 moved to the right to effect a right turn of the vehicle. FIGURE 5 shows the valve spool moved to the left to effect a left turn of the vehicle.

The flexible motion transmitting means 20 includes a pair of tubular members 96 and 98 connected between the steering control unit 16 and the steering knuckles of the steerable wheels of the vehicle. These tubular members may be metal or flexible tubing or hose. Movable roller means such as balls 100 fill each of the tubular members 96 and 98 so that the balls on the extreme ends of the series are in close proximity with the ends of the pusher rods 52 and 54 as shown, for example, at 102. The tubular members 96 and 98 are connected to the bosses 34 and 36 by lock nuts 104 and 106 respectively and positioned so that pusher rods 52 and 54 may push balls 100 into the tubular members 96 and 98. The tubular member 98 may be secured to a tubular extension 108 which in turn is secured to a cross member 110 of the vehicle chassis by a spherical anchor 112. A ball socket 114 attached to a tie rod arm 116 of steering knuckle 18a, on which the left wheel is mounted, has a pusher rod 118 attached thereto which extends into the tubular extension 108. A metal bellows 120 surrounds the pusher rod 118 and is connected between the ball socket 114 and the tubular extension 108 and expands and contracts with the turning of the steering knuckle 18a. A tie rod 122 may connect the steering knuckles 18a and 18b so that the latter move in unison. A similar arrangement to that just described and shown in the lower portion of FIGURE 2 connects the tubular assembly, of which tubular member 96 is a part, to steering knuckle 18b on which the right wheel of the vehicle is mounted.

While the operation of the steering arrangement disclosed herein should be apparent from the foregoing description, a brief summary of the operation will now be given. Assume that the operator of the vehicle wishes to make a right turn. The piston members 24 and 26 would normally be centralized in their respective cylinders 28 and 30. As the steering wheel 12 is turned to the right, the valve spool 68 is moved to the right (see FIGURE 4) through the action of the gear 94 on the follower pin 90 connected to the spool valve extension 92. This permits pressure fluid to flow around the spool valve 68 into the passages 38b and 38 to the cylinder 30 to move the piston 26 to the right as viewed in FIGURE 2. The piston movement is transmitted to the balls 100 in the tubular member 98 to the pusher rod 118 in the steering knuckle 18a to effect a turning of the wheels to the right. As the piston 26 moves to the right, the piston 24 is allowed to move to the left because the land 78 does not cover the pore 40b and hydraulic fluid is permitted to flow out of cylinder 28 through passage 40, and out return port 72 to the fluid reservoir.

A similar sequence of event takes place when the vehicle wheels are to be turned to the left except that the spool valve 68 is moved to the left as seen in FIGURE 5. In this position, the port 38b is blocked against the entry of pressure fluid, but the port 40b of the valve mechanism is open to the pressure fluid whereby pressure fluid moves through passage 40 to cylinder 28 and piston 24 urging the latter to the right as viewed in FIGURE 2. This moves the balls 100 in the tubular member 96 to the right causing the wheels to be turned to the left for a left turn. Pressure fluid is permitted to return to the reservoir from the cylinder 30 through passage 38, port 38b, radial passages 84, and passage 86, radial passages 82 and return port 72.

The steering wheel motion is also transferred to the pistons 24 and 26 directly by mechanical means through the gearing arrangement including gear 50 attached to the steering wheel, the gear 42 and the gear racks 46 and 48 connected to the pistons 24 and 26. Thus the pistons 24 and 26 are both hydraulically and mechanically actuated.

The flexible motion transmitting means 20 is particularly appropriate in this overall steering arrangement because it permits considerable latitude and flexibility in positioning the steering control unit housing and the associated valve control mechanism. This is so whether the valve control mechanism is separate from or an integral part of the steering control unit housing. With the use of the flexible motion transmitting means, the steering control unit and the valve control mechanism can be mounted in an environment where they are substantially free from the effects of road shocks, which are often transmitted back into a vehicle's steering gear.

While a preferred embodiment of the invention has been herein disclosed, it is to be understood that the invention is not limited thereto as other variations will be readily apparent to those skilled in the art and the invention is to be given its fullest possible interpretation within the terms of the following claims.

I claim:

1. In an automotive vehicle having a chassis frame wheels pivotally mounted thereon and a steering wheel for controlling the position of the wheels, a steering arrangement comprising:

a housing;

movable piston means including a piston member disposed in a cylinder bore formed in said housing and connected to a source of fluid pressure;

motion transmitting means operatively connected to said piston means and to the wheels whereby movement of said piston means effects pivotal movement of said wheels, said motion transmitting means including a tubular member extending between said housing and said wheels, a plurality of balls arranged in a row in a side-by-side relationship in said tubular member and a rod mounted in said housing for reciprocal movement having one end fixed to said piston member and its opposite end abutting the end ball at one end of said tubular member;

control means for controlling the admission of fluid pressure to said cylinder bore for moving said piston means to a plurality of positions;

gearing means operatively associated with said piston means for moving said piston means to a plurality of positions independently of fluid pressure;

and means for actuating said control means and said gearing means in unison upon movement of the steering wheel to effect movement of said piston means.

2. The steering arrangement of claim 1 wherein said control means comprises a reciprocal valve element operatively connected to the steering wheel, said valve element being movable to a first position to admit pressure fluid to said cylinder bore in response to a change in position of the steering wheel and to a second position to exhaust pressure fluid from said cylinder bore;

and said gearing means includes a gear rack carried by said piston member and movable therewith, a rotatable second gear in mesh with said gear rack and operatively connected to said steering wheel, said gear rack being movable upon rotation of said second gear by said steering wheel.

3. The steering arrangement of claim 2 wherein said piston means comprises a pair of said piston members, each of said piston members being slidably disposed in a respective cylinder bore formed in said housing, said cylinder bores being laterally spaced from each other with said second gear spaced therebetween, and the gear rack carried by each piston member being in meshing engagement with said second gear whereby rotation of said second gear effects movement of both of said piston members in unison, and said control means being effective to admit pressure fluid to one of said cylinder bores and to exhaust pressure fluid from the other of said cylinder bores to a reservoir when said valve element is in said first position said control means being effective to exhaust pressure fluid from said one of said cylinder bores to said reservoir and to admit pressure fluid to said other of said cylinder bores when said valve element is in said second position.

4. The steering arrangement of claim 3 wherein said control means further includes a pair of fluid conduits, each of said conduits being in fluid communication with a respective one of said cylinder bores, and said valve element comprises an axially movable spool type shuttle valve for selectively and alternatively establishing communication between said source of fluid pressure and said reservoir and said fluid conduits.

5. The steering arrangement of claim 3 wherein the longitudinal axes of said cylinder bores are spaced and parallel with respect to each other whereby said piston members are laterally spaced from each other and disposed to move along spaced, parallel axes.

References Cited

UNITED STATES PATENTS

| | | | |
|---|---|---|---|
| 2,709,495 | 5/1955 | Vickers | 180—79.2 |
| 2,848,056 | 8/1958 | Herbenar | 180—79.2 |
| 2,849,888 | 9/1958 | Herbenar | 180—79.2 X |
| 2,957,361 | 10/1960 | Herbenar | 180—79.2 X |

FOREIGN PATENTS 574,364   7/1924   France.

BENJAMIN HERSH, *Primary Examiner.*

JOHN A. PEKAR, *Assistant Examiner.*

U.S. Cl. X.R.

74—501